US012645341B2

(12) United States Patent
Morvan et al.

(10) Patent No.: US 12,645,341 B2
(45) Date of Patent: Jun. 2, 2026

(54) MODIFYING NOTES WITHIN VIRTUAL SCENE

(71) Applicant: GOOGLE LLC, Mountain View, CA (US)

(72) Inventors: Stiven Guillaume Francois Morvan, New York, NY (US); Yodahe Alemu, New York, NY (US); Serena Imani Brantley, Concord, NC (US)

(73) Assignee: Google LLC, Mountain View, CA (US)

( * ) Notice: Subject to any disclaimer, the term of this patent is extended or adjusted under 35 U.S.C. 154(b) by 215 days.

(21) Appl. No.: 18/400,636

(22) Filed: Dec. 29, 2023

(65) Prior Publication Data

US 2025/0217000 A1     Jul. 3, 2025

(51) Int. Cl.
| | |
|---|---|
| *G06F 3/04815* | (2022.01) |
| *G06F 3/01* | (2006.01) |
| *G06T 19/00* | (2011.01) |

(52) U.S. Cl.
CPC .......... *G06F 3/04815* (2013.01); *G06F 3/011* (2013.01); *G06F 3/017* (2013.01); *G06T 19/006* (2013.01)

(58) Field of Classification Search
CPC . G06F 3/01; G06F 3/0481; G06F 3/14; G06F 3/16; G06F 3/042; G06F 3/04815; G06F 3/147; G06F 15/00; G06F 3/03; G06F 3/048
See application file for complete search history.

(56) References Cited

U.S. PATENT DOCUMENTS

| | | | |
|---|---|---|---|
| 2015/0029223 A1* | 1/2015 | Kaino | G09G 3/002 |
| | | | 345/633 |
| 2015/0186351 A1* | 7/2015 | Hicks | G06F 3/0482 |
| | | | 715/232 |
| 2019/0019348 A1* | 1/2019 | Yamamoto | G06F 3/017 |
| 2020/0201436 A1* | 6/2020 | Han | G06F 3/011 |

OTHER PUBLICATIONS

Hanegraaf, "Sticky notes", Arkio (https://support.arkio.is/hc/en-us/articles/7460499998109-Sticky-notes), 2022, 3 pages.
Lee, et al., "Post-Post-It: A Spatial Ideation System in VR for Overcoming Limitations of Physical Post-It Notes", CHI '21 Extended Abstracts, https://doi.org/10.1145/3411763.3451786, May 8-13, 2021, 7 pages.

* cited by examiner

*Primary Examiner* — Rayeez R Chowdhury
(74) *Attorney, Agent, or Firm* — Brake Hughes Bellermann LLP

(57) ABSTRACT

A non-transitory computer-readable storage medium comprises instructions stored thereon. When executed by at least one processor, the instructions are configured to cause a virtual reality device to present a set of notes to a virtual reality user on a virtual object within a virtual scene; receive a selection of an original note from the set of notes; in response to receiving the selection of the original note, present an expanded note to the user, the expanded note being based on the original note and being displaced from the virtual object; receive a modification to the expanded note; and replace, within the set of notes on the virtual object, the original note with a modified note, the modified note being based on the original note and the modification to the expanded note.

19 Claims, 21 Drawing Sheets

Display
912

Object
908

Computing system 1100

Image generator 1102

Feedback processor 1110

Selection processor 1104

Processor 1112

Modification processor 1106

Memory 1114

Location determiner 1108

Input/output 116

1200

MODIFYING NOTES WITHIN VIRTUAL SCENE

TECHNICAL FIELD

This description relates to virtual reality.

BACKGROUND

Users can interact with objects within a virtual reality environment.

SUMMARY

Within a virtual reality environment, notes can be presented on an object such as a wall. A virtual reality user can select one of the notes, which can be considered an original note. An expanded version of the original note, which can be considered an expanded note, can be presented to the virtual reality user. The virtual reality user can modify the expanded note, such as by making writing motions with a hand of the user. The modification to the expanded note can result in a modified note. The original note on the virtual object can be replaced with the modified note.

According to an example, a non-transitory computer-readable storage medium comprises instructions stored thereon. When executed by at least one processor, the instructions are configured to cause a virtual reality device to present a set of notes to a virtual reality user on a virtual object within a virtual scene; receive a selection of an original note from the set of notes; in response to receiving the selection of the original note, present an expanded note to the user, the expanded note being based on the original note and being displaced from the virtual object; receive a modification to the expanded note; and replace, within the set of notes on the virtual object, the original note with a modified note, the modified note being based on the original note and the modification to the expanded note.

According to an example, a computing system comprises at least one processor and a non-transitory computer-readable storage medium comprising instructions stored thereon. When executed by the at least one processor, the instructions are configured to cause the computing system to present a set of notes to a virtual reality user on a virtual object within a virtual scene; receive a selection of an original note from the set of notes; in response to receiving the selection of the original note, present an expanded note to the user, the expanded note being based on the original note and being displaced from the virtual object; receive a modification to the expanded note; and replace, within the set of notes on the virtual object, the original note with a modified note, the modified note being based on the original note and the modification to the expanded note.

According to an example, a method comprises determining that a first virtual reality user is in a first virtual location within a virtual reality environment; causing a first virtual reality device associated with the first virtual reality user to present, based on the first virtual reality user being in the first virtual location, a first virtual reality scene including a set of notes; receiving, from the first virtual reality device, a modification to an original note from the set of notes; replacing, within the set of notes based on receiving the modification to the original note, the original note with a modified note; determining that a second virtual reality user is in the first virtual location; based on determining that the second virtual reality user is in the first virtual reality location, causing a second virtual reality device associated with the second user to present a second virtual reality scene including the set of notes, the set of notes including the modified note; determining that a third virtual reality user is in a second virtual reality location, the second virtual reality location being different from the first virtual reality location; and based on determining that the third virtual reality user is in the second virtual reality location, causing a third virtual reality device associated with the third virtual reality user to present a third virtual reality scene without presenting the set of notes.

The details of one or more implementations are set forth in the accompa-nying drawings and the description below. Other features will be apparent from the description and drawings, and from the claims.

BRIEF DESCRIPTION OF THE DRAWINGS

Like reference numbers refer to like elements.

DETAILED DESCRIPTION

Within a virtual reality environment, a set of notes can be presented on a virtual reality object. The set of notes can be presented to a virtual reality user who is in a virtual reality location proximal to the virtual reality object and/or a portion of the virtual reality object that is within a line of sight of the virtual reality user. The virtual reality user may desire to modify a note, which can be considered an original note, within the set of notes. A technical problem with modifying the original note is that the original note can be difficult to interact with within the set of notes.

A technical solution to the technical problem of difficult interaction with the original notes is to expand the original note in response to the selection of the original note by the virtual reality user. The virtual reality user can interact with the expanded original note, such as by writing on the expanded original note. The expanded original note can be considered an expanded note. The virtual reality user can interact with the expanded note, such as by writing on the expanded original note, with hand movements simulating writing movements that are detected by a virtual reality device worn by the virtual reality user and/or a controller in communication with the virtual reality device. A technical benefit to the technical solution of expanding the original note is the case of modifying the expanded note by the virtual reality user and improved accuracy in detecting the modifications. The modifications to the expanded note can result in a modified note. The virtual reality user can return the modified note to the virtual reality object.

The modified note can be available to other virtual reality users who are in, or who enter, a same virtual reality location as the virtual reality user who modified the original note. A server or other computing device associated with the virtual reality environment can determine whether other, subsequent, virtual reality users are in the same virtual reality location as the virtual reality location in which the virtual reality user modified the original note, and/or are proximal to the virtual object on which the modified note was placed. If the server determines that a subsequent user is in a same virtual reality location as the virtual reality user, and/or is proximal to the virtual object, then the server can present the modified note to the subsequent user. If the server determines that the subsequent virtual reality user is not in the same virtual reality location, and/or is not proximal to the virtual object, then the server will not present the modified note to the subsequent virtual reality user.

Figure 1A:
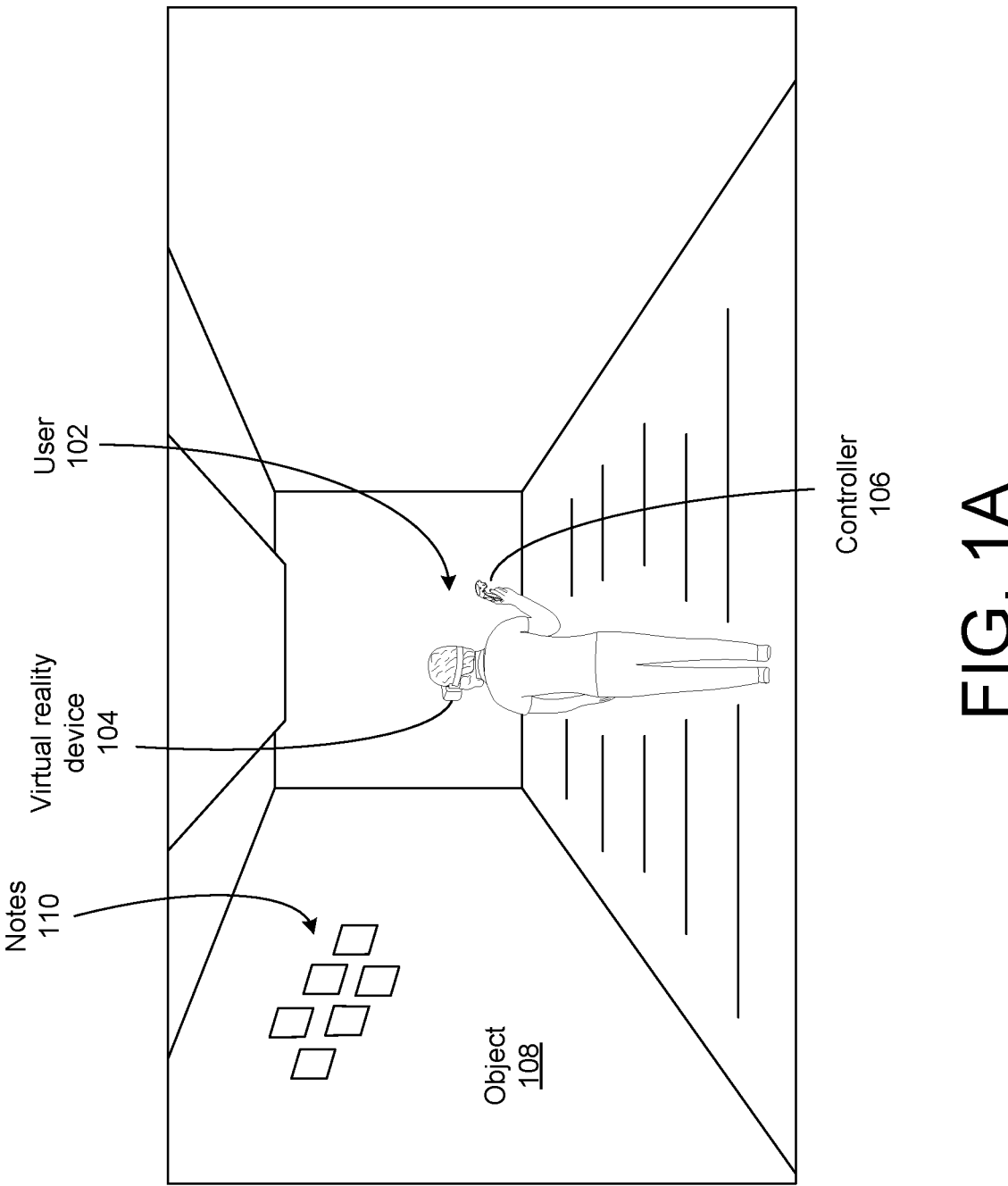
FIGS. 1A and 1B show a first virtual reality user and a virtual object with a set of notes.
Figure 1B:
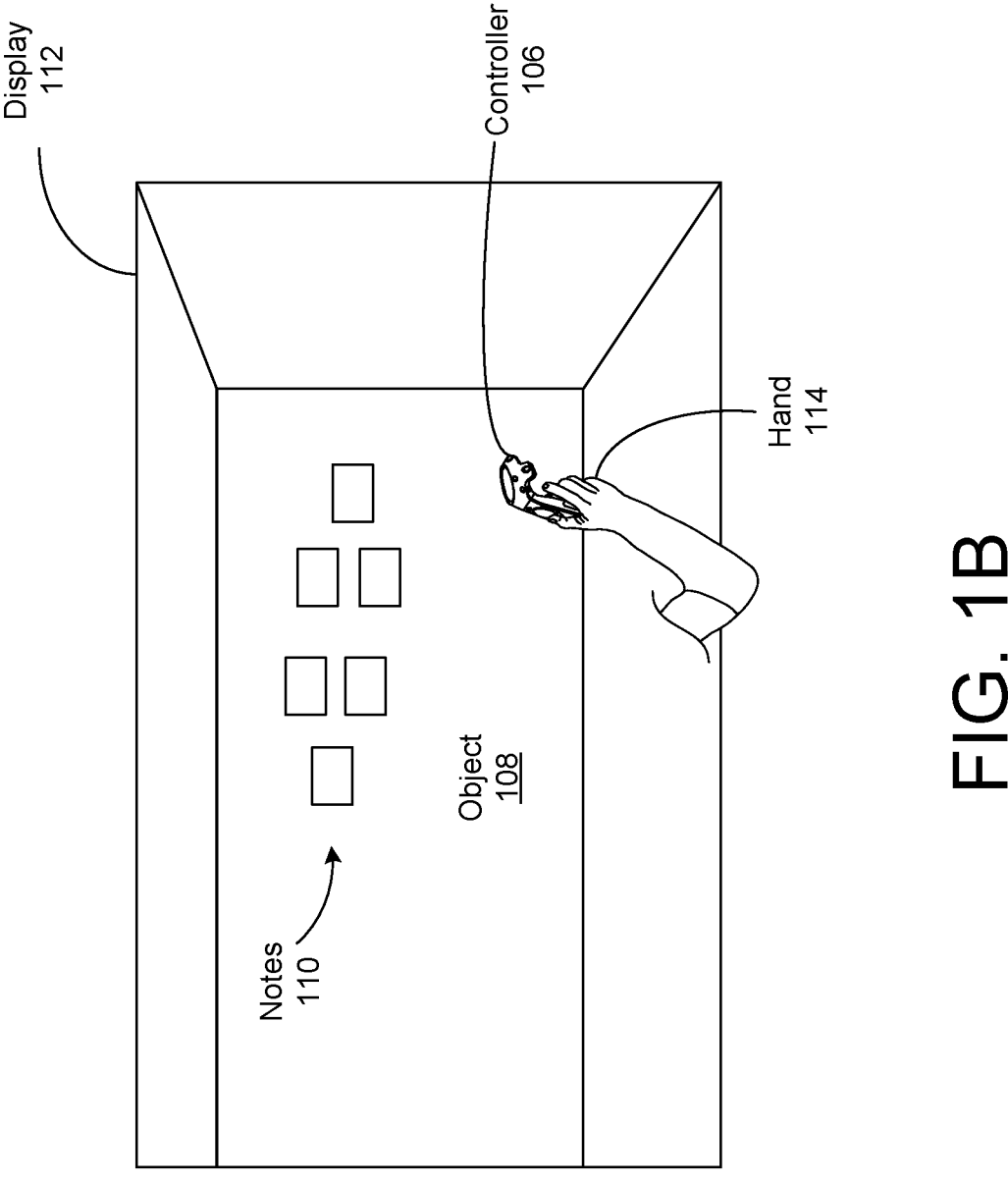

FIGS. 1A and 1B show a first virtual reality user 102 and a virtual object 108 with a set of notes 110. FIG. 1A is a perspective view of a virtual reality scene that includes the first virtual reality user 102, and FIG. 1B is a view of a display 112 as seen by the first virtual reality user 102. The display 112 is included in a virtual reality device 104 worn by the first virtual reality user 102.

The first virtual reality user 102 can enter the virtual reality scene by wearing the virtual reality device 104. The virtual reality device 104 can present the virtual reality scene to the first virtual reality user 102 via the display 112. The virtual reality device 104 can be in communication with a server, such as the server 1002 shown in FIG. 10, that maintains a virtual reality environment including the virtual reality scene. The server 1002 can send virtual reality data to the virtual reality device 104, such as existence of, attributes and/or features of, and locations of, objects such as the virtual object 108 and set of notes 110. The virtual reality device 104 can generate a perspective and/or view of the virtual reality scene for presentation on the display 112 based on the virtual reality data received from the server 1002. The virtual reality device 104 can send data to the server 1002, such as input and/or interaction from the first virtual reality user 102. The server 1002 can modify the virtual reality scene and/or virtual reality environment based on the input and/or interaction from the first virtual reality user 102. The server 1002 can present the modified virtual reality scene and/or virtual reality environment to other virtual reality users, such as a second virtual reality user 802 shown in FIG. 8A and/or a third virtual reality user 902 shown in FIG. 9A.

In the example of FIGS. 1A and 1B, the virtual reality scene includes a virtual reality object 108 and a set of notes 110 on the virtual object 108. The virtual reality user 102 can be considered to be in a first virtual reality location. The virtual object 108 can include a wall on which the set of notes 110 are disposed. The set of notes 110 can appear to be held on, and/or stuck to, the virtual object 108 by an adhesive substance or by magnetic coupling between the set of notes 110 and the virtual object 108.

The first virtual reality user 102 can hold a controller 106. The controller 106 can be an electronic device in communication with the virtual reality device 104. The controller 106 can include one or more devices that measure orientation, acceleration, and/or movement, such as an accelerometer, gyroscope, and/or an inertial measurement unit (IMU). In some examples, the controller 106 can include one or more buttons or triggers. The controller 106 can measure and/or monitor movement of the hand of the first virtual reality user 102, such as writing motion and/or pointing at a note within the set of notes 110 and or a location or portion of the virtual object 108.

Figure 2A:
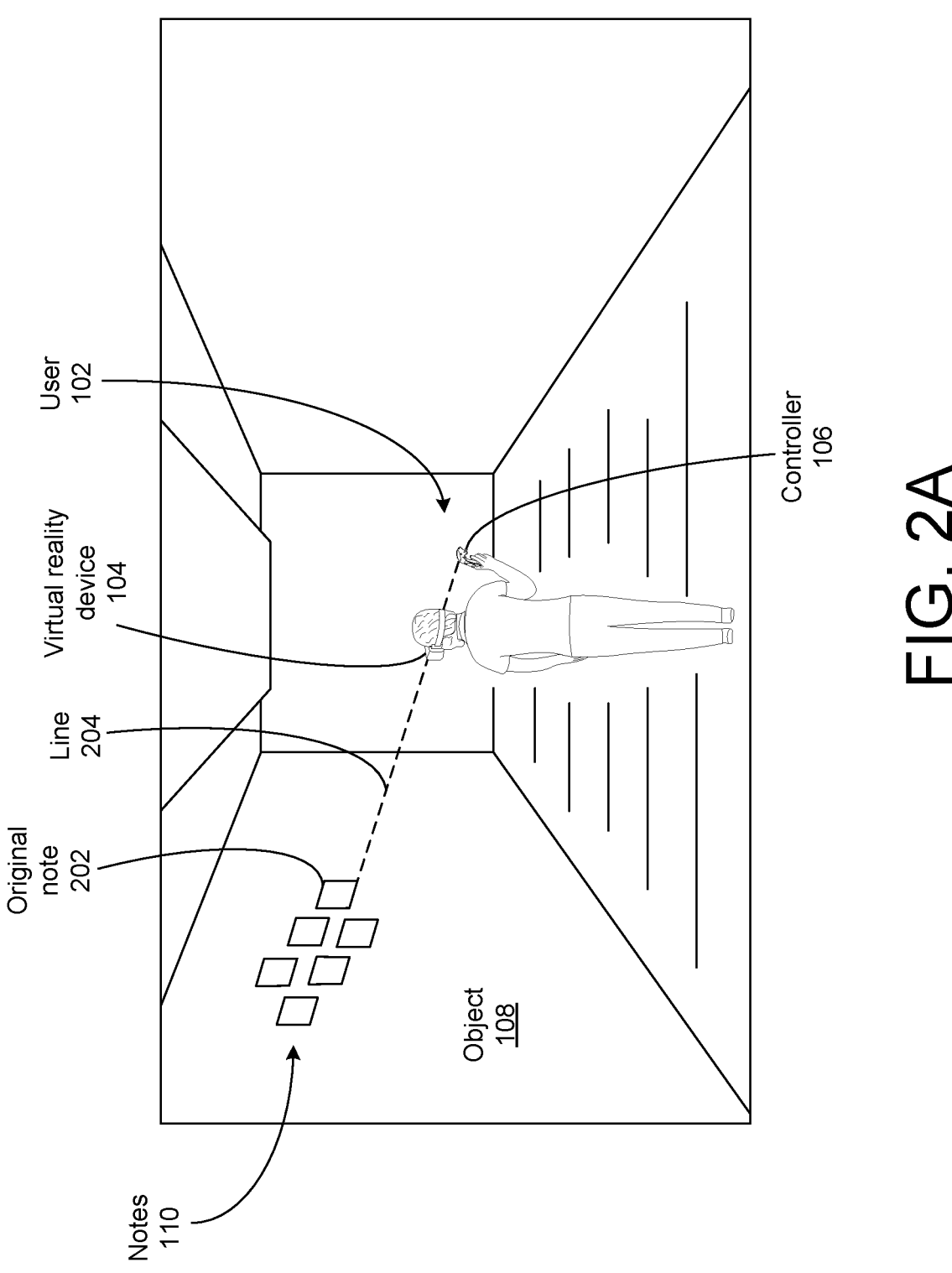
FIGS. 2A and 2B show the first virtual reality user selecting an original note from the set of notes.
Figure 2B:
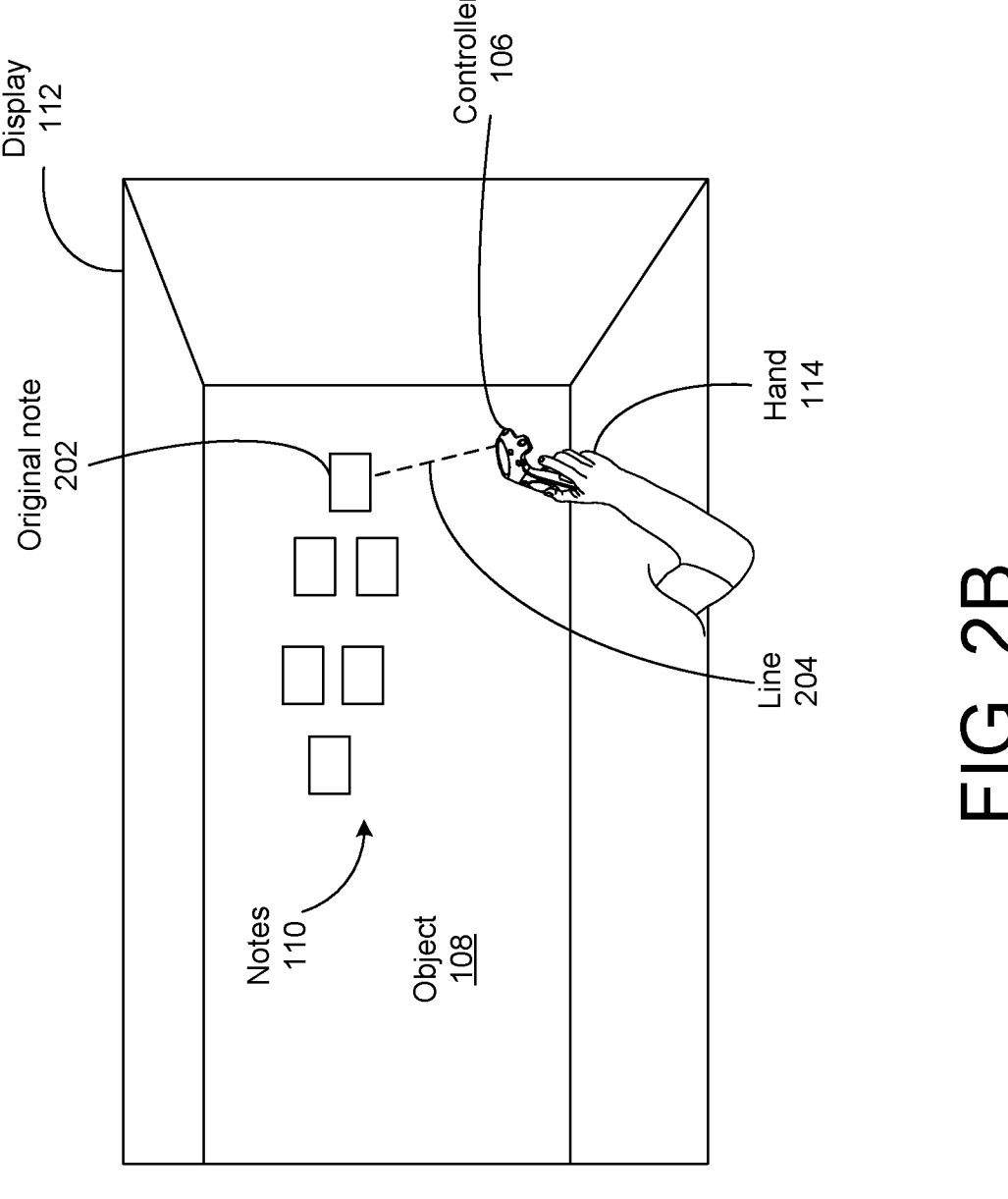

FIGS. 2A and 2B show the first virtual reality user 102 selecting an original note 202 from the set of notes 110. The original note 202 can be a note that has not yet been modified by the first virtual reality user 102.

The first virtual reality user 102 can select the original note 202 by pointing the controller 106 at the original note 202. In some examples, the first virtual reality user 102 selects the original note 202 by pointing the controller 106 at the original note 202 and pressing a button or trigger on the controller 106. In some examples, the first virtual reality user 102 selects the original note 202 by pointing a finger of the first virtual reality user 102 at the original note 202. In some examples, the first virtual reality user 102 selects the original note 202 by pointing the controller 106 or pointing a finger of the first virtual reality user 102, at the original note 202, and speaking an audible instruction to select the original note 202.

In some examples, the display 112 presents a line 204 extending from the controller 106 and/or finger of the first virtual reality user 102 in a direction that the controller 106 and or finger of the first virtual reality user 102 was pointing. In some examples, the display 112 presents the line 204 in the direction that the controller 106 and/or finger of the user 102 is pointing in response to the first virtual reality user 102 pressing a button or trigger on the controller 106 and/or in response to an audible instruction from the first virtual reality user 102.

Figure 3A:
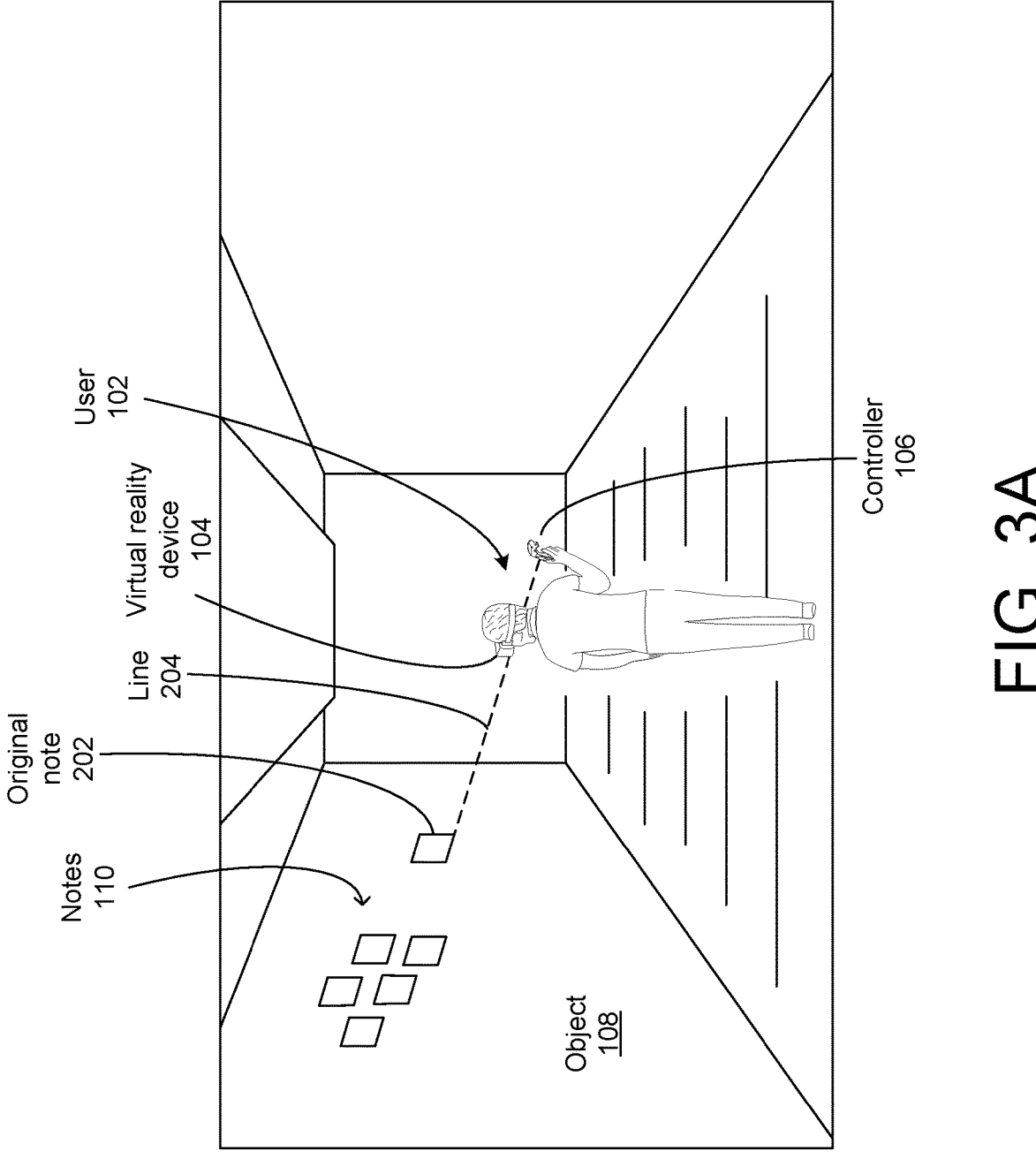
FIGS. 3A and 3B show the original note moving toward the virtual reality user.
Figure 3B:
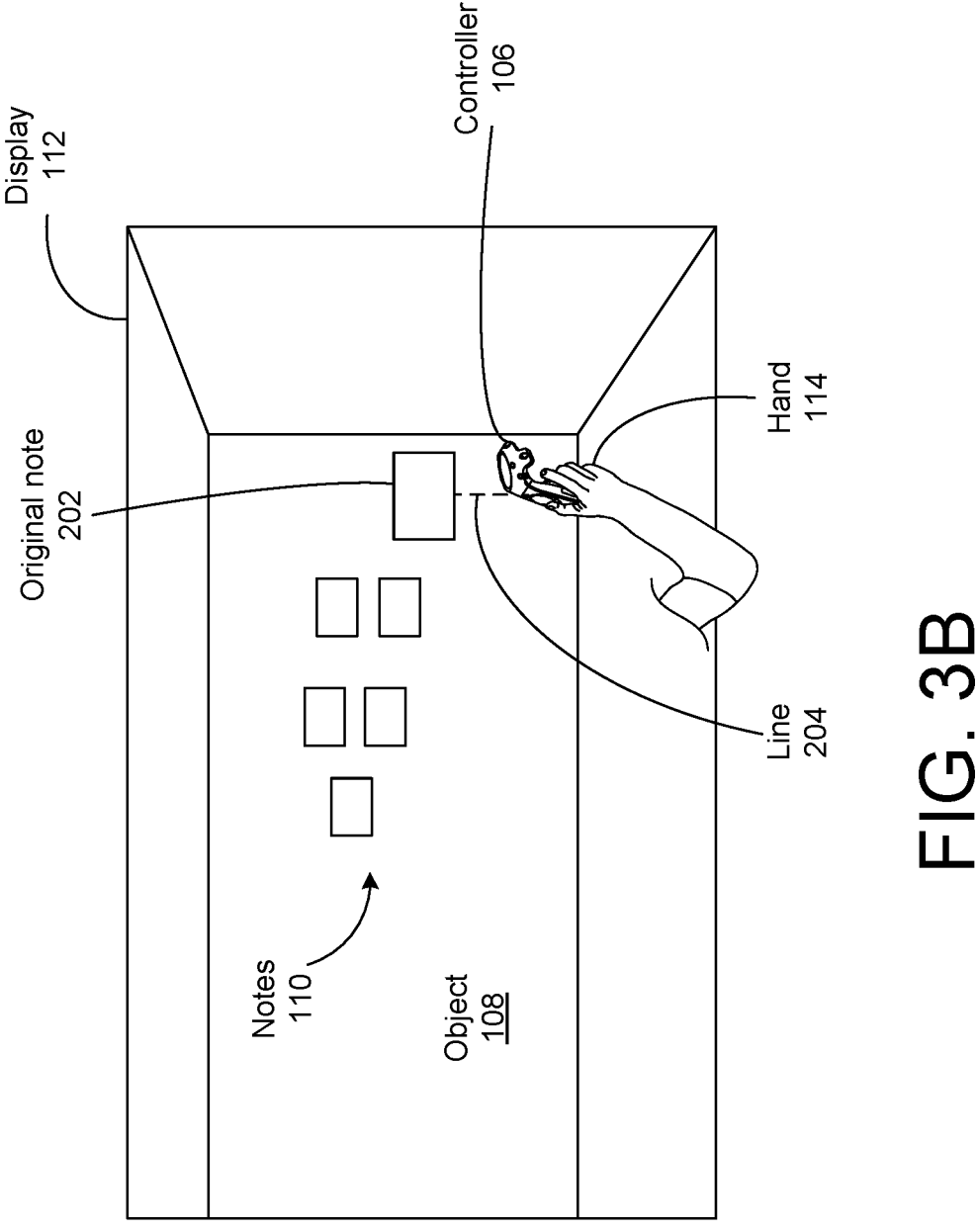

FIGS. 3A and 3B show the original note 202 moving toward the first virtual reality user 102. In some examples, the virtual reality device 104 and/or server 1002 causes the display 112 to present the original note 202 as moving away from the virtual object 108 and toward the first virtual reality user 102 in response to movement of the controller 106 and/or hand of the first virtual reality user 102. Moving the original note 202 away from the virtual object 108 and toward the first virtual reality user 102 displaces the original note 202 from the virtual object 108. In some examples, the virtual reality device 104 and/or server 1002 causes the display 112 to present the original note 202 as moving toward the first virtual reality user 102 in response to the first virtual reality user 102 pressing or releasing a button on the controller 106. In some examples, the movement of the original note 202 away from the virtual object 108 can initially be slow, simulating a magnetic attraction between the original note 202 and the virtual object 108, as if the original note 202 was held to the virtual object 108 by magnetic force.

Figure 4A:
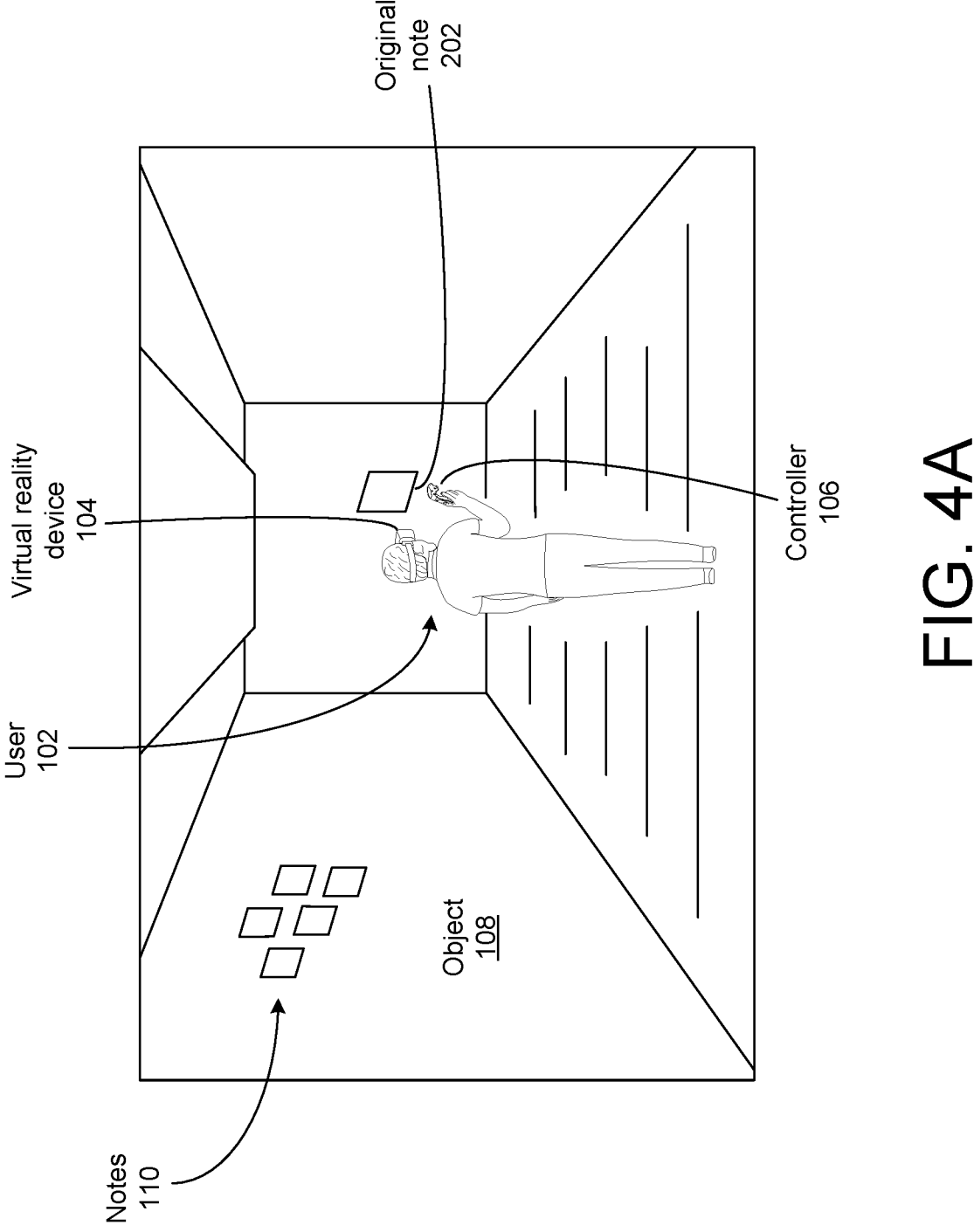
FIGS. 4A and 4B show the original note presented to the first virtual reality user in an expanded form.
Figure 4B:
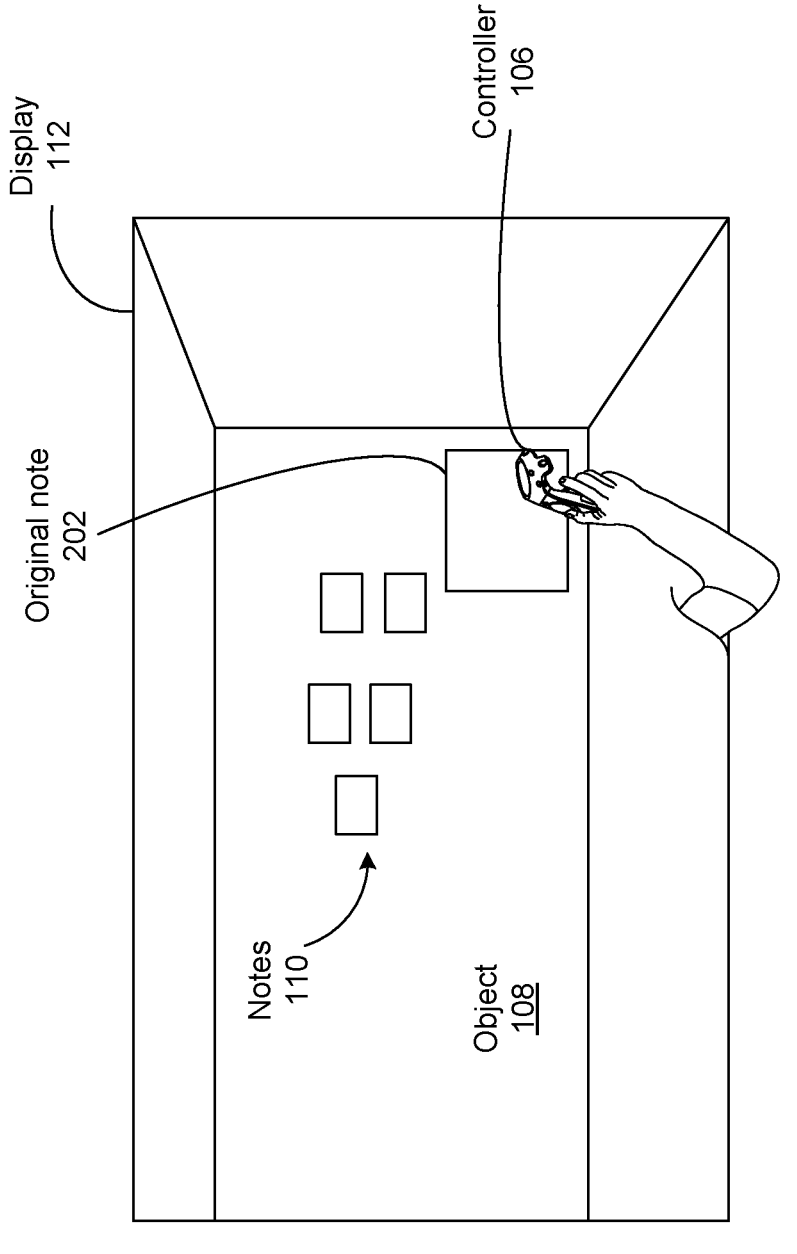

FIGS. 4A and 4B show the original note 202 presented to the first virtual reality user 102 in an expanded form. The virtual reality device 104 and/or display 112 can expand the original note 202 into the expanded form in response to the original note 202 moving in front of the first virtual reality user 102. The original note 202 can move in front of the first virtual reality user 102 in response to movement of the controller 106 or hand 114 of the first virtual reality user 102 and/or in response to audible instruction from the first virtual reality user 102. After expanding into the expanded form, the original note 202 can be considered an expanded note. The expanded note can be an enlarged and/or expanded version of the original note 202. The expanded note can include the same content, such as writing or drawing, as the original note 202, in expanded form.

In some examples, the first virtual reality user 102 can select and/or adjust a size of the original note 202 when the original note 202 is enlarged and/or expanded. The first virtual reality user 102 can select and/or adjust the size of the original note 202 based on hand motions and/or audible instructions. In some examples, the size of the original note 202 is based on a previous size selection by the first virtual reality user 102.

Figure 5A:
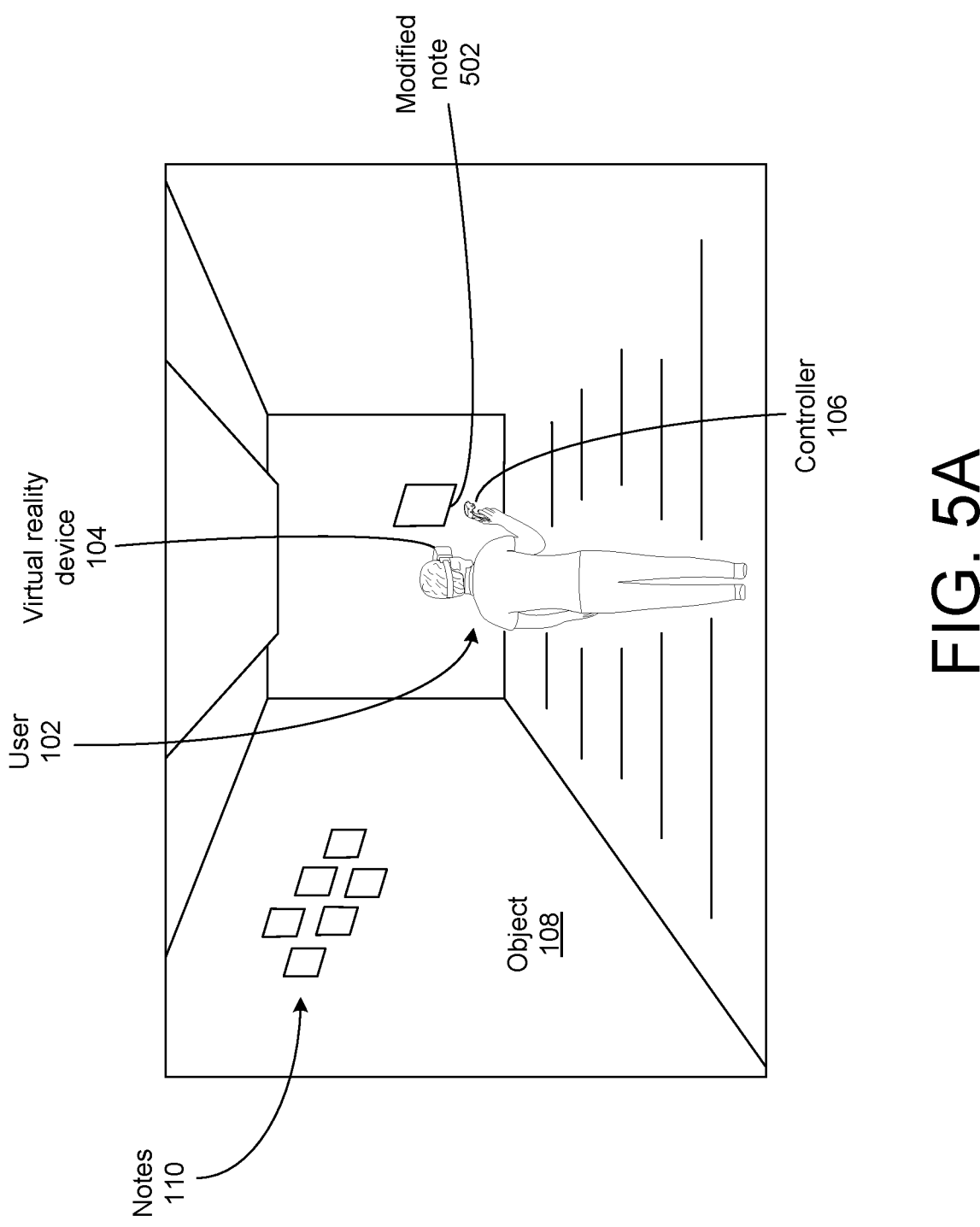
FIGS. 5A and 5B show the first virtual reality user modifying the expanded note to generate a modified note.
Figure 5B:
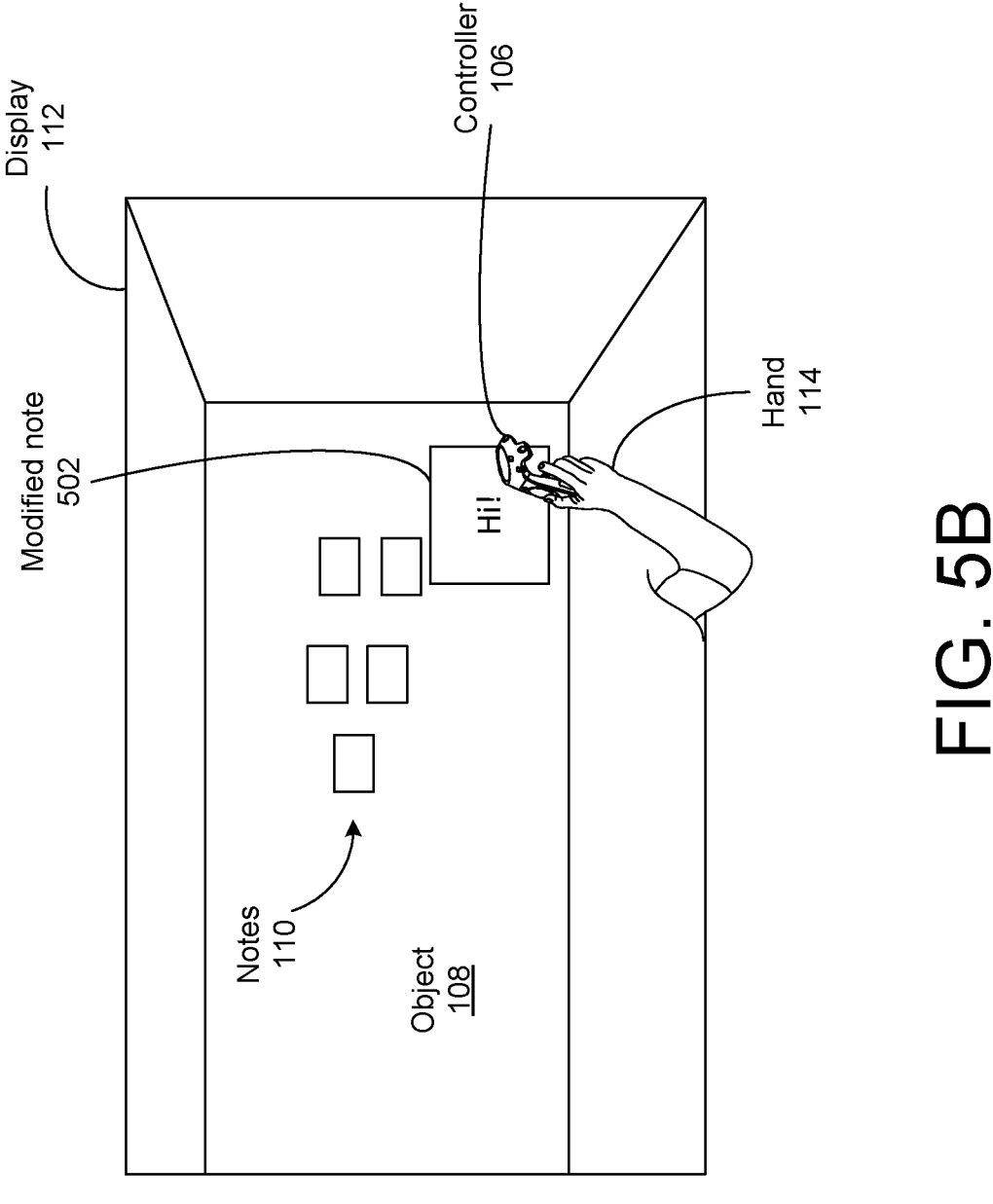

FIGS. 5A and 5B show the first virtual reality user 102 modifying the expanded note to generate a modified note 502. The first virtual reality user 102 modifies the expanded note by making writing and/or drawing motions at a location at which the expanded note appears. The first virtual reality user 102 can make the writing motions with a finger of the first virtual reality user 102 or with the controller 106. The first virtual reality user 102 holds the controller 106 with a hand 114 of the first virtual reality user 102. A tip of the finger of the first virtual reality user 102 or end of the controller 106 can act as a tip of a pen or pencil.

The virtual reality device 104 and/or display 112 responds to the writing and/or drawing motions by presenting writing and/or drawing on the modified note 502. In some examples, the virtual reality device 104 also responds to the writing and/or drawing motions by causing the controller 106 to provide haptic feedback, such as vibration, to the first virtual reality user 102. The virtual reality device 104 can cause the controller 106 to provide the haptic feedback when the first virtual reality user 102 is making a writing and/or drawing motion and the hand 114 and/or controller 106 is within a threshold distance of the location of the modified note 502. The haptic feedback can inform the first virtual reality user 102 that the hand 114 and/or controller 106 is in the correct location.

In the example shown in FIG. 5B, the modification is writing the word "Hi!" The display 112 presents the word, "Hi!," on the modified note 502. In some examples, the virtual reality device 104 and display 112 present the writing and/or drawing corresponding to movements of the hand 114 and/or controller 106 on the modified note 502. In some examples, the virtual reality device 104 and/or server 1002 recognizes gestures corresponding to characters based on the movements of the hand 114 and/or controller 106, and causes the display 112 to present the characters on the modified note 502 based on the recognized gestures.

Figure 6A:
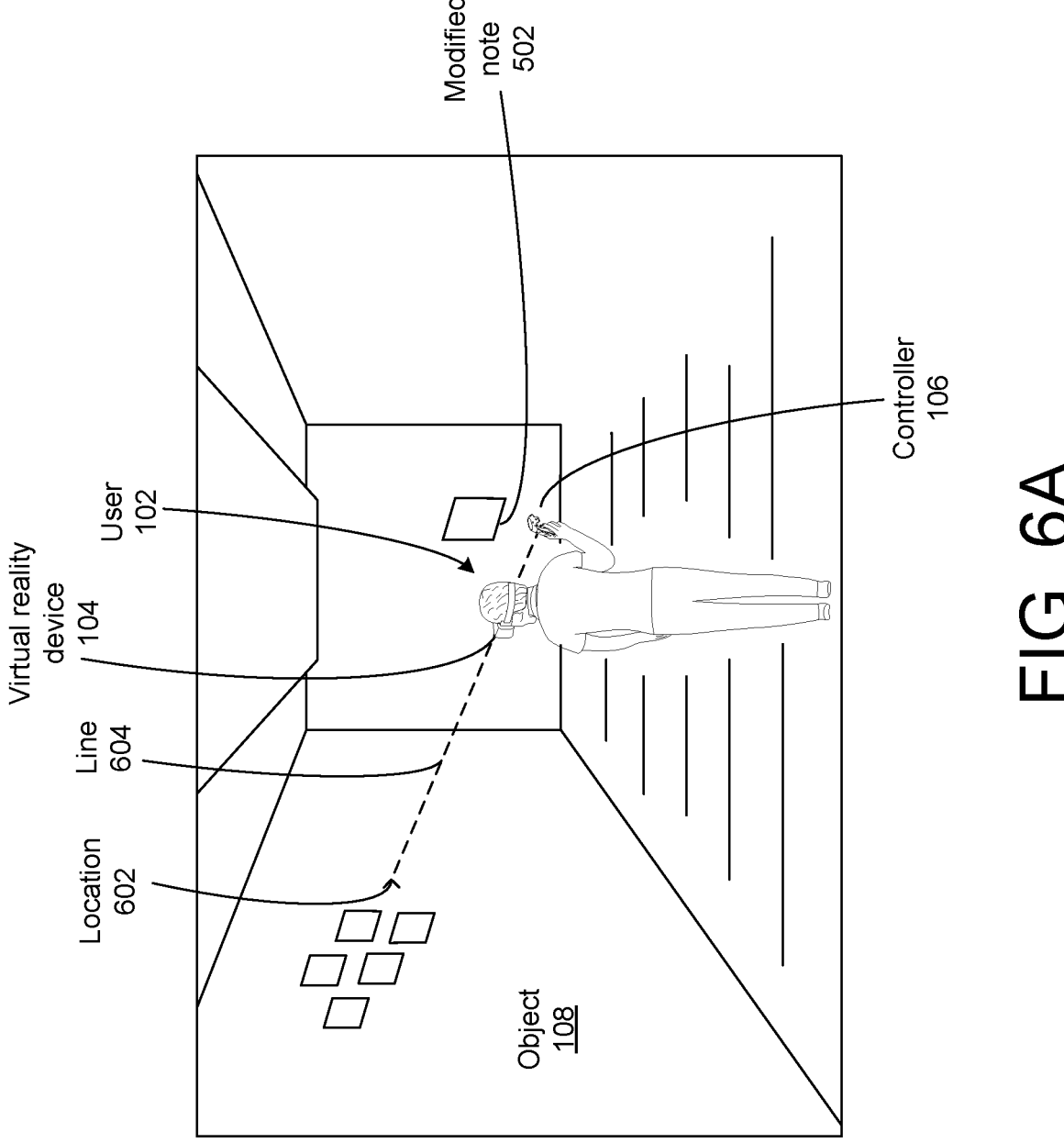
FIGS. 6A and 6B show the first virtual reality user selecting a location on the virtual object on which to place the modified note.
Figure 6B:
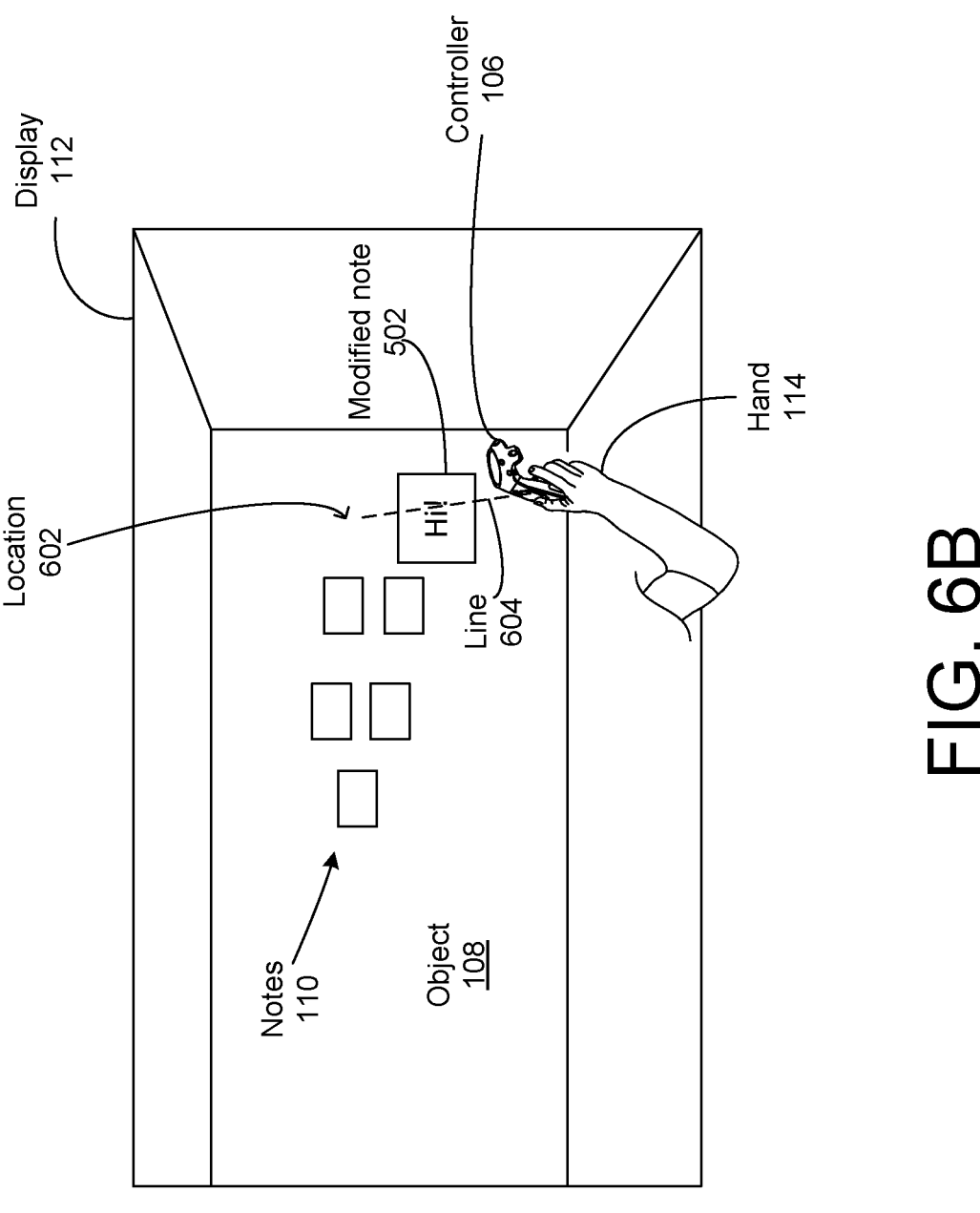

FIGS. 6A and 6B show the first virtual reality user 102 selecting a location 602 on the virtual object 108 on which to place the modified note 502. The first virtual reality user 102 selects location 602 by pointing the controller 106 and/or a finger of the virtual user 102 at the location 602. In some examples, the first virtual reality user 102 presses a button or trigger on the controller 106, and/or provides an audible instruction, while pointing the controller 106 and/or finger at the location 602. The virtual reality device 104 and/or server 1002 responds to the selection of the location 602 by causing the display 112 to present the modified note 502 as moving toward and onto the location 602. In some examples, the display 112 presents a line 604 extending from the controller 106 and/or finger of the first virtual reality user 102 to the selected location 602. The modified note 502 can move along the line 604 to the selected location 602. When the modified note 502 is close to the selected location 602, the modified note 502 can quickly move toward the selected location 602, as if pulled toward the selected location 602 on the virtual object 108 by magnetic attraction between modified note 502 and virtual object 108. The modified note 502 is also returned to the original, smaller, size when the modified note 502 is moving toward and onto the virtual object 108.

Figure 7A:
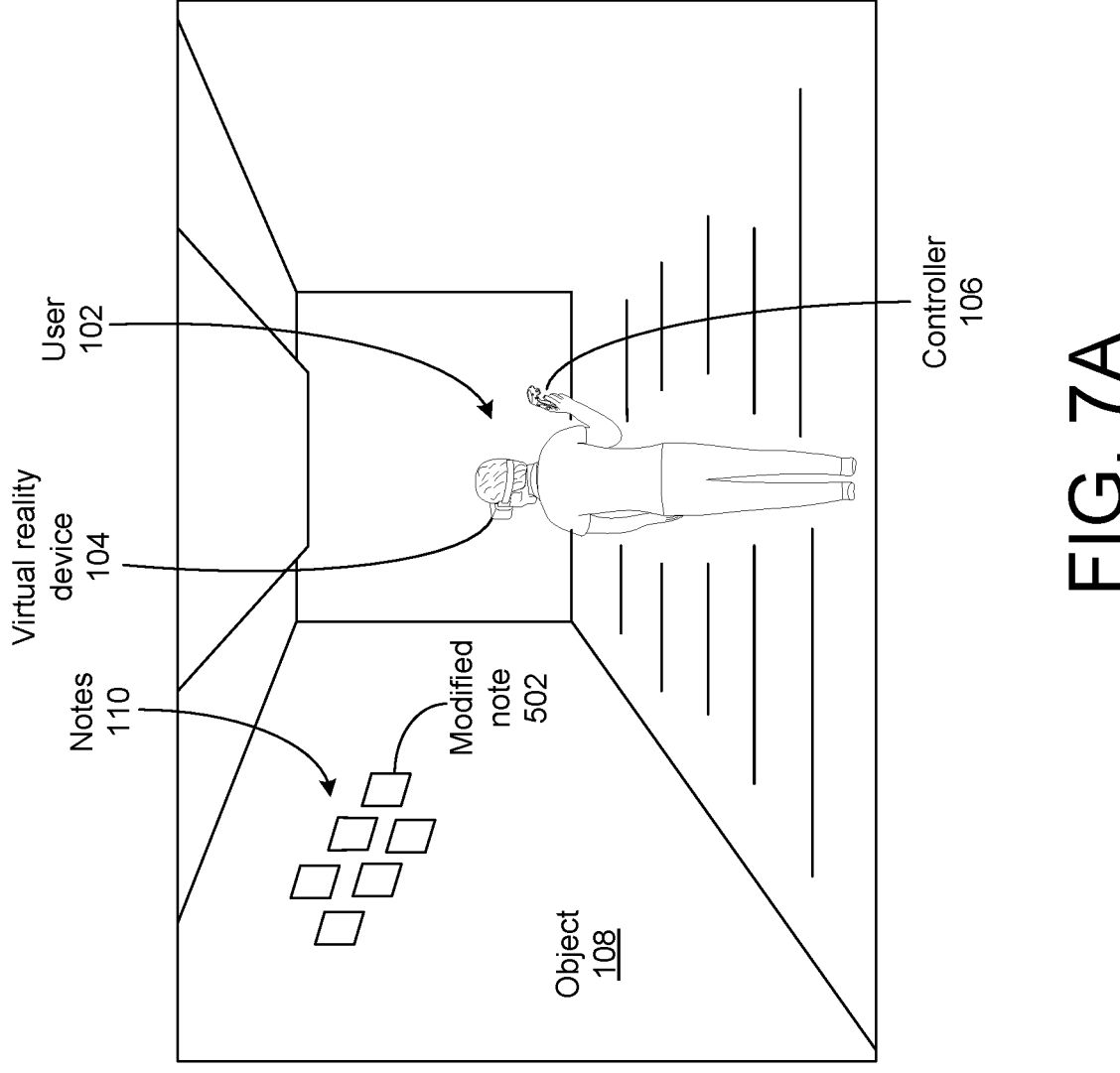
FIGS. 7A and 7B show the modified note on the virtual object.
Figure 7B:
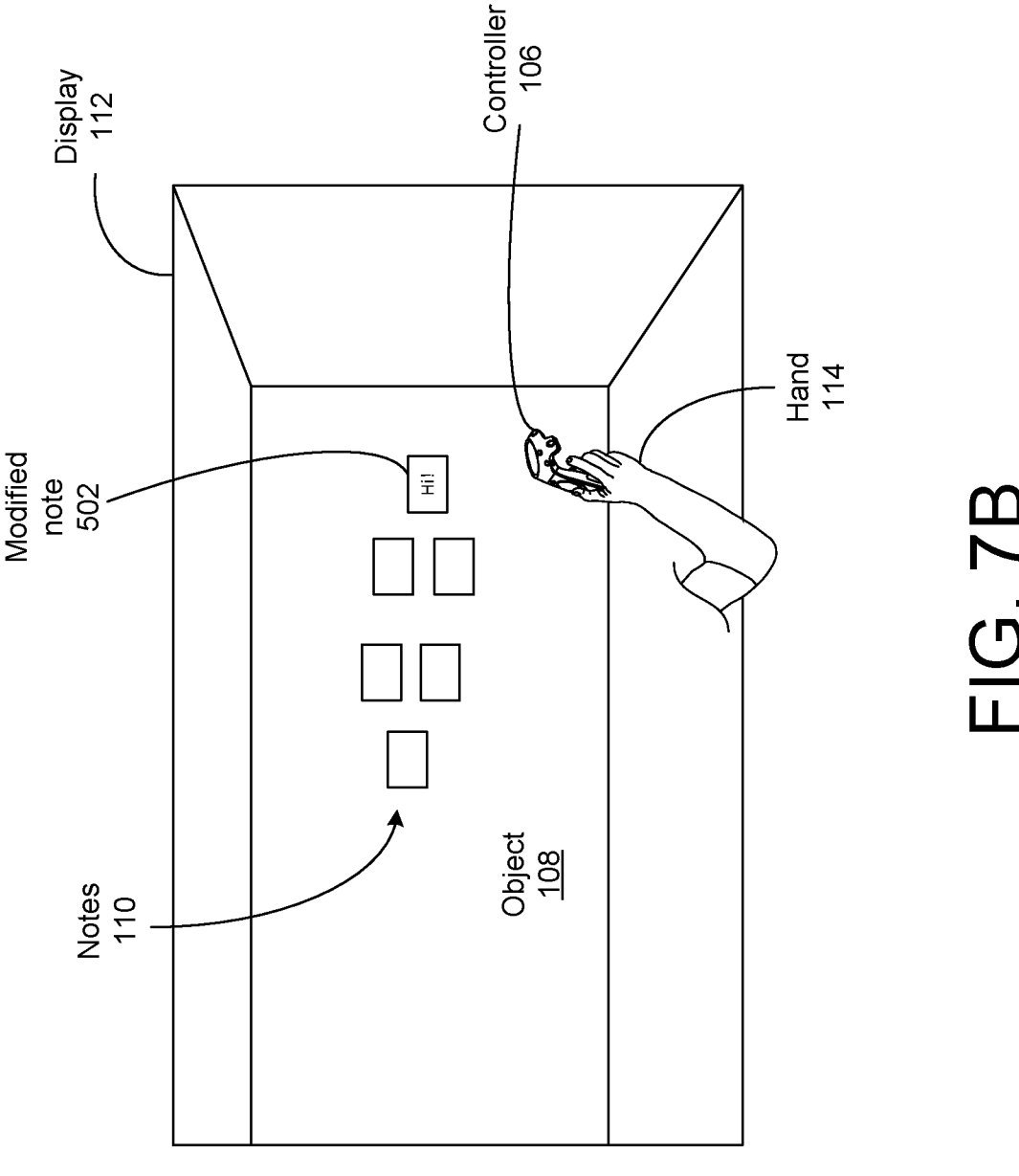

FIGS. 7A and 7B show the modified note 502 on the virtual object 108. The modified note 502 has moved on to the virtual object 108 at the selected location. The modified note 502 is now included in the set of notes 110. The modified note 502 has replaced the original note 202 within the set of notes 110. The modified note 502, as well as the other notes within the set of notes 110, are available for other virtual users to view and/or interact with.

Figure 8A:
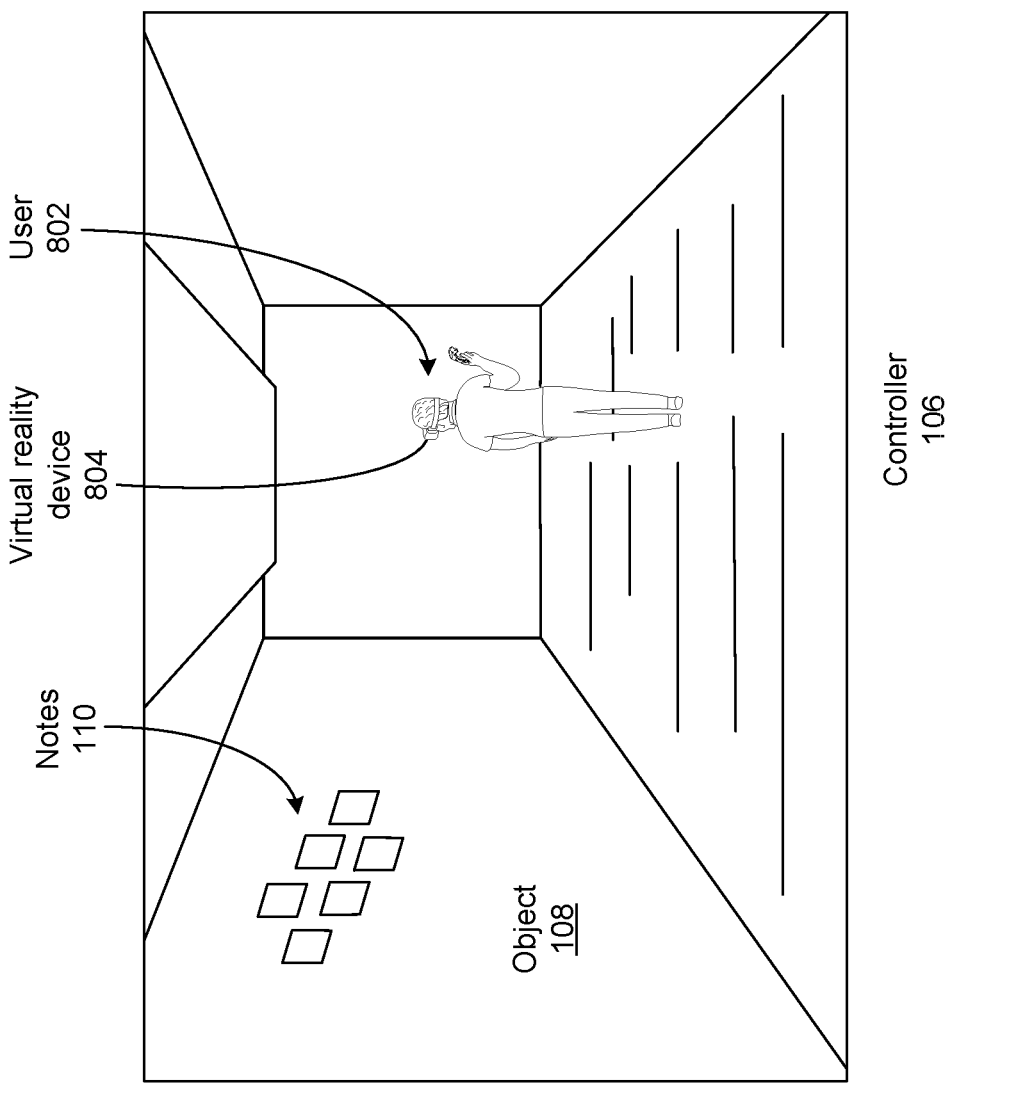
FIGS. 8A and 8B show a second virtual reality user viewing the virtual reality object and set of notes.
Figure 8B:
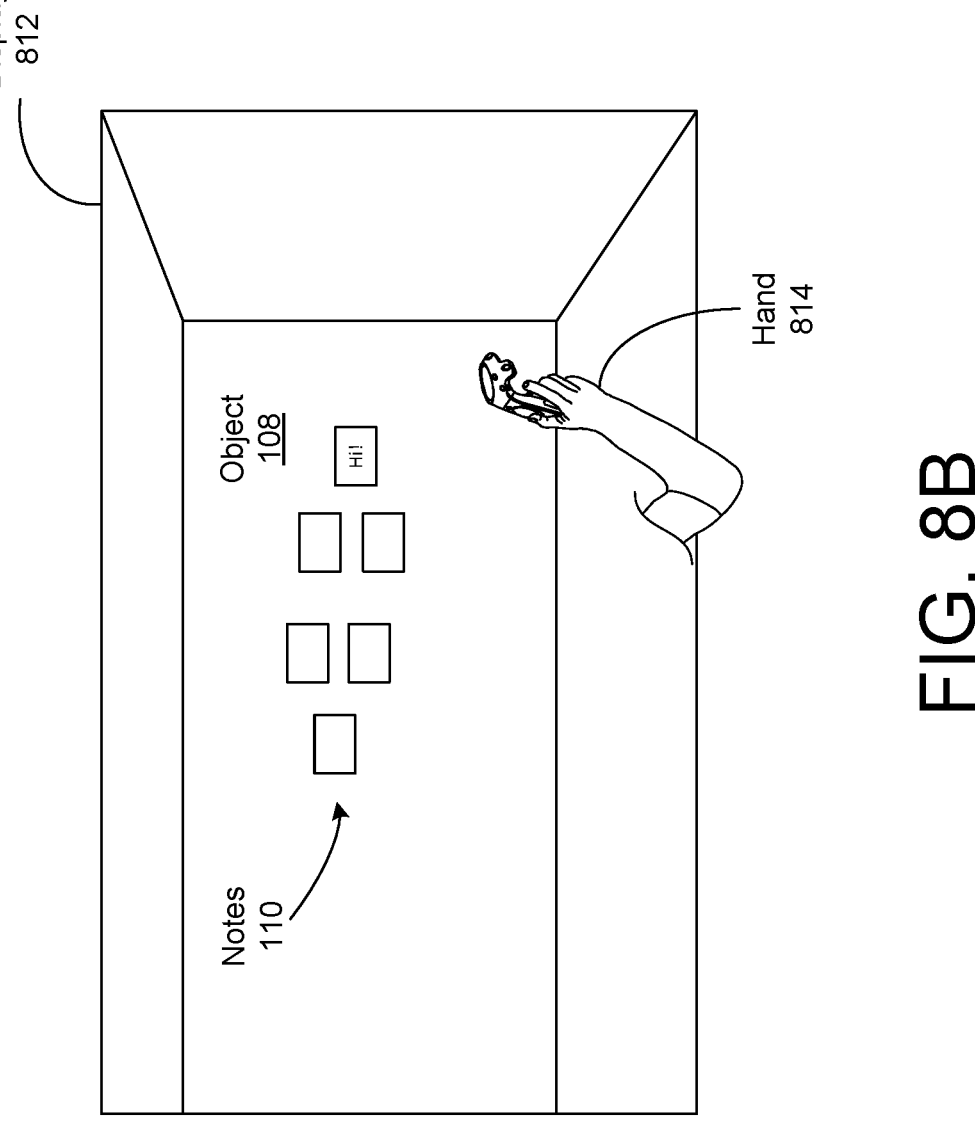

FIGS. 8A and 8B show a second virtual reality user 802 viewing the virtual reality object 108 and set of notes 110. The virtual reality user 802 can wear and/or interact with a virtual reality device 804. The virtual reality device 804 can have similar features and/or functionality as the virtual reality device 104.

The virtual reality user 802 can be considered a second virtual reality user. The virtual reality user 802 can have an account recognized by the server 1002. The virtual reality user 802 can enter the virtual reality scene by logging in with the server 1002 and interacting with the environment to move to a location within the virtual reality environment in proximity to the object 108. The virtual reality user 802 can be considered to be in a same location with respect to the virtual reality object 108 as the first virtual reality user 102. In some examples, the virtual reality user 802 is considered to be in the same, first virtual reality location, within the virtual reality environment as the first virtual reality user 102 based on being within a line of sight of the set of notes 110. A display 812 included in the virtual reality device 804 can present a portion of the virtual reality object 108 and the set of notes 110. The second virtual reality user 802 can interact with and/or view notes within the set of notes 110 in a similar manner as the first virtual reality user 102 based on being in the same location as the first virtual reality user 102 with respect to the virtual reality object 108 and/or the set of notes 110.

Figure 9A:
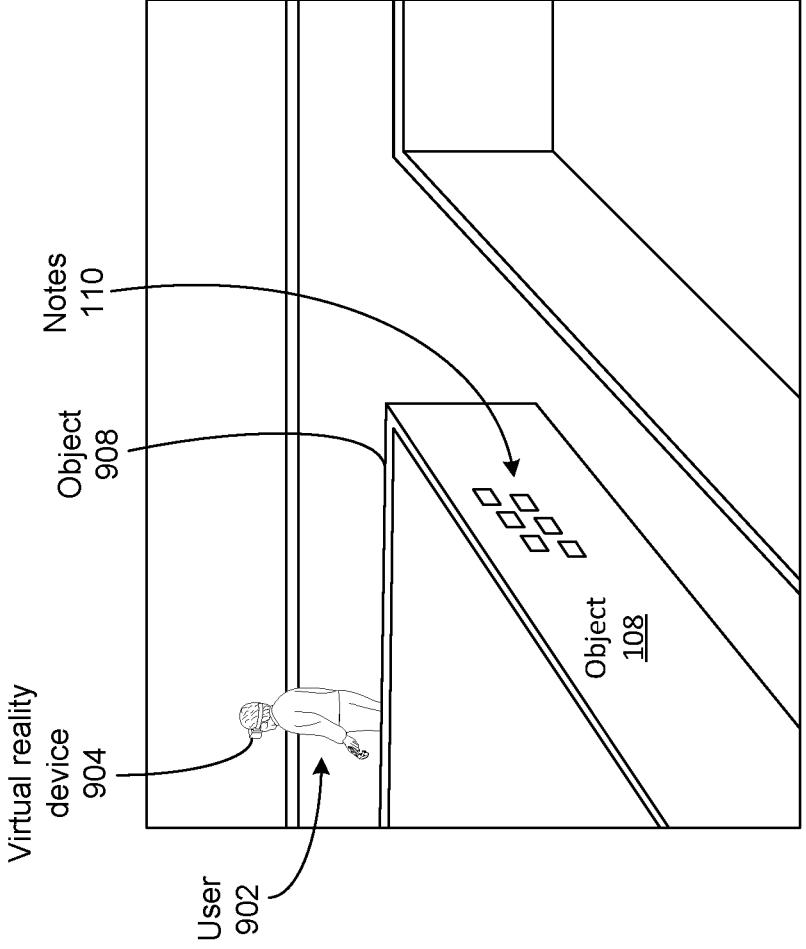
FIGS. 9A and 9B show a third virtual reality user in a different location within a virtual reality environment than former locations of the first virtual reality user and second virtual reality user.
Figure 9B:
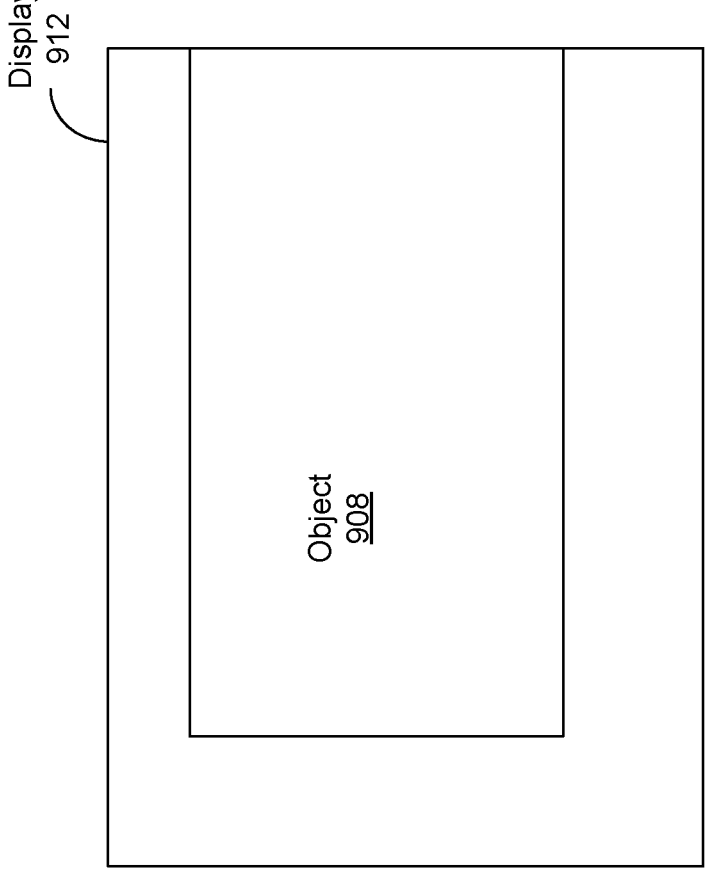

FIGS. 9A and 9B show a third virtual reality user 902 in a different location within the virtual reality environment than former locations of the first virtual reality user 102 and second virtual reality user 802. The virtual reality user 902 can be considered a third virtual reality user. The virtual reality user 902 can have an account and log into the server 1002 via the account. The virtual reality user 902 can be in a different location within the virtual reality environment than the virtual reality users 102, 802. The virtual reality user 902 can be considered to be in a different, second virtual reality location, than the virtual reality users 102, 802, based on the virtual reality user 902 not being within a line of sight of the set of notes 110 on the object 108. The virtual reality user 902 can wear a virtual reality device 904. The virtual reality device 904 can have similar features and/or functionality as the virtual reality devices 104, 804. The virtual reality device 904 can include a display 912 that presents a virtual scene to the virtual reality user 902. The scene presented by the display 912 can include an object 908. The object 908 can include a wall adjacent to the object 108 that included and/or presented the set of notes 110. The object 908 does not present notes. The virtual reality user 902 could walk around the wall and/or objects 908, 108 to view the set of notes 110. If the virtual reality user 902 did walk around the wall and/or objects 908, 108 to view the set of notes 110, then the virtual reality user 902 could view and/or interact with notes within the set of notes 110 in a similar manner as the first virtual reality user 102.

Figure 10:
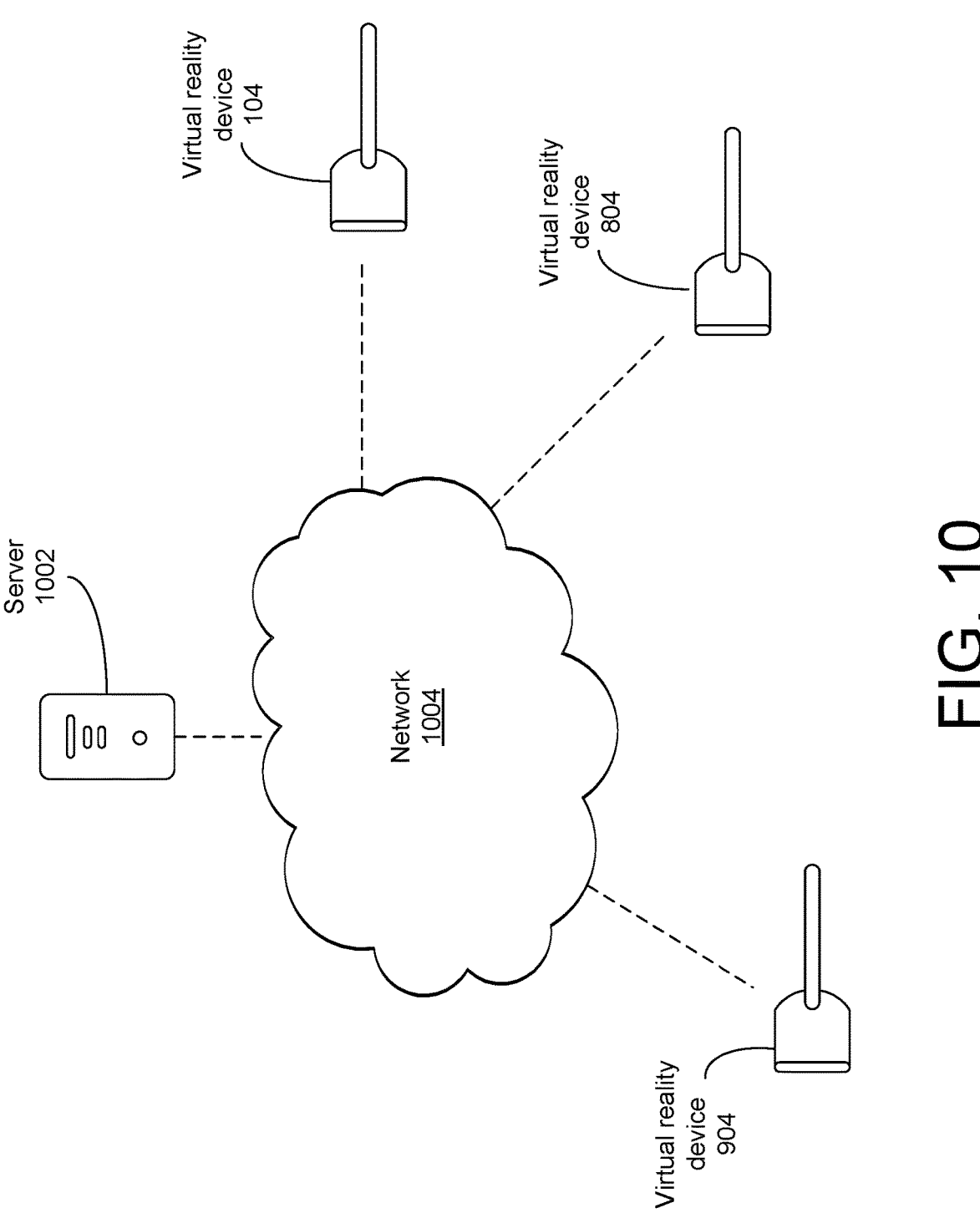
FIG. 10 is a system diagram showing a server and multiple virtual reality devices.

FIG. 10 is a system diagram showing the server 1002 and multiple virtual reality devices 104, 804, 904. The virtual reality devices can include the virtual reality devices 104, 804, 904 discussed above. While three virtual reality devices 104, 804, 904 are shown in FIG. 10, the server 1002 can communicate with any number of virtual reality devices. The server 1002 can communicate with the virtual reality devices via a network 1004 such as the Internet.

The server 1002 can maintain a virtual reality environment. The virtual reality environment can include objects such as the objects 108, 908 and set of notes 110 discussed above. The virtual reality environment can also include virtual reality users including a virtual reality user viewing the virtual scene and other virtual reality users. The server 1002 can maintain locations of users and allow users to move within the virtual reality environment. The server 1002 can store states and/or attributes of objects, such as writing included on and/or stored in association with notes.

In some examples, the server 1002 can facilitate communication between virtual reality users such as the virtual reality users 102, 802, 902 by means other than notes. For example, if virtual reality users are in proximal locations within the virtual reality environment at the same time, then the server 1002 can cause the respective virtual reality devices to present representations of the virtual reality users to each other and/or transmit voice or other audio data between the virtual reality users.

Figure 11:
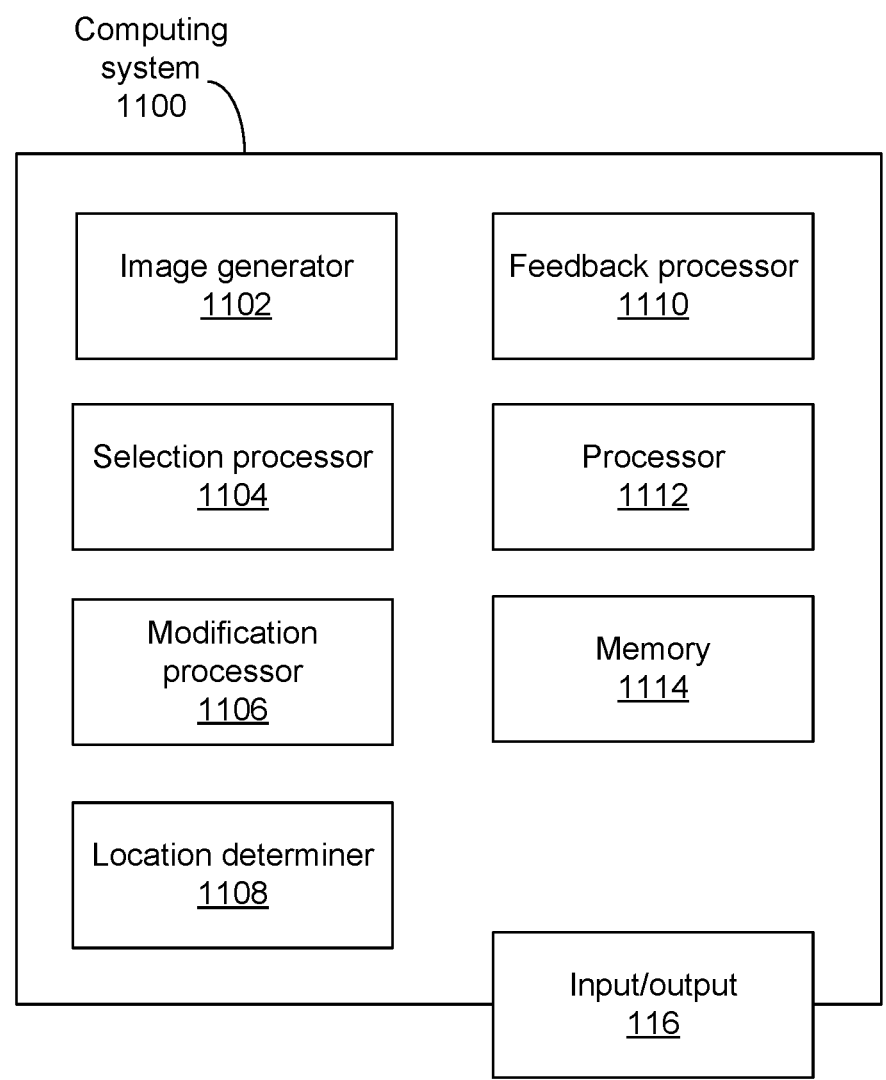
FIG. 11 is a block diagram of a computing system.

FIG. 11 is a block diagram of a computing system 1100. The computing system 1100 can implement features described above with respect to the server 1002 and/or virtual reality devices 104, 804, 904. Methods, functions, and/or techniques described with respect to the computing system 1100 can be performed by the server 1002, one or more of the virtual reality devices 104, 804, 904, and/or distributed between any combination of the server 1002, virtual reality devices 104, 804, 904, and/or controller 106.

The computing system 1100 can include an image generator 1102. The image generator 1102 can generate images of a virtual scene. The image generator 1102 can generate the images of the virtual scene based on a location of a user, such as the users 102, 802, 902 described above, and any objects within view of the location of the user, such as the objects 108, 908 and/or set of notes 110. The image generator 1102 can generate the image for presentation on a display of a virtual reality device, such as the displays 112, 812, 912. The images shown in the preceding figures as being displayed and/or presented by the displays 112, 812, 912 are examples of images generated by the image generator 1102.

The computing system 1100 can include a selection processor 1104. The selection processor 1104 can process and or recognize selections by a user, such as the first virtual reality user 102. The selection processor 1104 can, for example, determine and/or recognize a direction that the user is pointing with a finger of the user or a controller held and/or controlled by the user. The selection processor 1104 can determine a note and/or object selected by the user based on the direction that the user is pointing. The selection processor 1104 can determine a note and/or object that the user is selecting based on the direction that the user is pointing and input on a button or trigger or audible instruction. The selection processor 1104 can instruct and/or cause the image generator 1102 to move, expand, and/or contract an object, such as a note, based on the selection process and/or recognized by the selection processor 1104.

The computing system 1100 can include a modification processor 1106. The modification processor 1106 can process modifications to objects, such as notes, based on input from a user. The modification processor 1106 can, for example, recognize movements of a hand, finger, and/or controller of a user. The modification processor 1106 can recognize writing and/or drawing based on the recognized movements. The modification processor 1106 can modify an object, such as a note, based on the recognized writing and/or drawing. The modification processor 1106 can, for example, add writing and/or drawing to an object such as a note based on the recognized writing and/or drawing.

The computing system 1100 can include a location determiner 1108. The location determiner 1108 can determine a location of a virtual reality user. The location determiner 1108 can determine the location based on a previous location, a location selected by the user, or movement by the virtual reality user in the virtual reality environment. The movement by the virtual reality user can include walking, simulation of walking, instructions to move or walk, or selection of locations such as the user pointing a controller toward a location and pressing a button, causing the location of the user to change to the location that was pointed to.

The computing system 1100 can include a feedback processor 1110. The feedback processor 1110 can process and/or generate feedback in response to input from a virtual reality user. The feedback processor 1110 can, for example, cause a controller to provide haptic feedback in response to the virtual reality user making writing and/or drawing motions. The feedback processor 1110 can cause the controller to provide haptic feedback in response to the virtual reality user making writing and/or drawing motions when a hand of the virtual reality user and/or controller held by the virtual reality user is in a location corresponding to an object on which the virtual reality user is writing and/or drawing. The haptic feedback can include the controller 106 vibrating. The haptic feedback can inform the user that the hand of the virtual reality user and/or controller is in the correct location to draw and/or write.

The computing system 1100 can include at least one processor 1112. The at least one processor 1112 can execute instructions, such as instructions stored in at least one memory device 1114, to cause the computing system 1100 to perform any combination of methods, functions, and/or techniques described herein.

The computing system 1100 can include at least one memory device 1114. The at least one memory device 1114 can include a non-transitory computer-readable storage medium. The at least one memory device 1114 can store data and instructions thereon that, when executed by at least one processor, such as the processor 1112, are configured to cause the computing system 1100 to perform any combination of methods, functions, and/or techniques described herein. Accordingly, in any of the implementations described herein (even if not explicitly noted in connection with a particular implementation), software (e.g., processing modules, stored instructions) and/or hardware (e.g., processor, memory devices, etc.) associated with, or included in, the computing system 1100 can be configured to perform, alone, or in combination with the computing system 1100, any combination of methods, functions, and/or techniques described herein.

The computing system 1100 may include at least one input/output node 1116. The at least one input/output node 1116 may receive and/or send data, such as from and/or to, a server, and/or may receive input and provide output from and to a user. The input and output functions may be combined into a single node, or may be divided into separate input and output nodes. The input/output node 1116 can include a microphone, camera, a display, a speaker, one or more buttons, a gyroscope, accelerometer, inertial measurement unit (IMU), and/or one or more wired or wireless interfaces for communicating with other computing devices.

Figure 12:
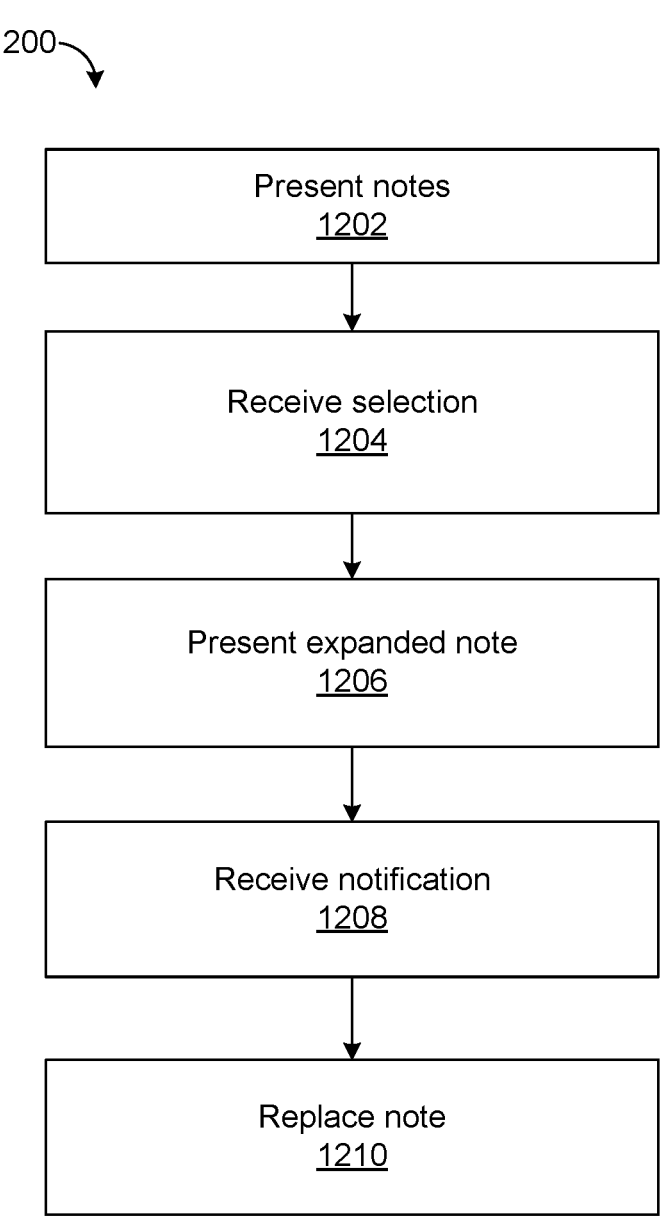
FIG. 12 is a flowchart showing a method performed by the computing system.

FIG. 12 is a flowchart showing a method 1200 performed by the computing system 1100. The method 1200 includes presenting notes (1202). Presenting notes (1202) can include presenting a set of notes 1120 to a virtual reality user 102 on a virtual object 108 within a virtual scene. The method 1200 includes receiving a selection (1204). Receiving a selection (1204) can include receiving a selection of an original note 202 from the set of notes 110. The method 1200 includes presenting an expanded note (1206). Presenting in expanded note (1206) can include, in response to receiving the selection of the original note 110, presenting an expanded note to the virtual reality user 102, the expanded note being based on the original note 202 and being displaced from the virtual object (108). The method 1200 can include receiving a modification (1208). Receiving a modification (1208) can include receiving a modification to the expanded note. The method 1200 can include replacing the note (1210). Replacing the note (1210) can include replacing, within the set of notes 110 on the virtual object 108, the original note 202 with a modified note 502, the modified note 502 being based on the original note 202 and the modification to the expanded note.

In some examples, the presenting the set of notes is based on a determination that the user is proximal to the virtual object.

In some examples, the receiving the modification to the expanded note includes interpreting writing gestures by the virtual reality user.

In some examples, the receiving the selection of the original note includes receiving the selection of the original note based on detecting hand movement by the virtual reality user.

In some examples, the method further includes providing haptic feedback to the virtual reality user in response to receiving the modification to the expanded note.

In some examples, presenting the expanded note includes presenting the expanded note with a size based on a previous size selection by the virtual reality user.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a virtual reality device to:

present a set of notes to a virtual reality user on a virtual object within a virtual scene;

receive a selection of an original note from the set of notes;

in response to receiving the selection of the original note, present the original note as moving away from the virtual object and toward the virtual reality user and expanding to generate an expanded note, the expanded note being based on the original note and being displaced from the virtual object;

receive a modification to the expanded note; and replace, within the set of notes on the virtual object, the original note with a modified note, the modified note being based on the original note and the modification to the expanded note.

2. The non-transitory computer-readable storage medium of claim 1, wherein the presenting the set of notes is based on a determination that the virtual reality user is proximal to the virtual object.

3. The non-transitory computer-readable storage medium of claim 1, wherein the receiving the modification to the expanded note includes interpreting writing gestures by the virtual reality user.

4. The non-transitory computer-readable storage medium of claim 1, wherein the receiving the selection of the original note includes receiving the selection of the original note based on detecting hand movement by the virtual reality user.

5. The non-transitory computer-readable storage medium of claim 1, wherein the instructions are further configured to cause the virtual reality device to provide haptic feedback to the virtual reality user in response to receiving the modification to the expanded note.

6. The non-transitory computer-readable storage medium of claim 1, wherein expanding the original note to generate the expanded note includes presenting the expanded note with a size based on a previous size selection by the virtual reality user.

7. A computing system comprising:

at least one processor; and a non-transitory computer-readable storage medium comprising instructions stored thereon that, when executed by the at least one processor, are configured to cause the computing system to:

present a set of notes to a virtual reality user on a virtual object within a virtual scene;

receive a selection of an original note from the set of notes;

in response to receiving the selection of the original note, present the original note as moving away from the virtual object and toward the virtual reality user and expanding to generate an expanded note, the expanded note being based on the original note and being displaced from the virtual object;

receive a modification to the expanded note; and replace, within the set of notes on the virtual object, the original note with a modified note, the modified note being based on the original note and the modification to the expanded note.

8. The computing system of claim 7, wherein the presenting the set of notes is based on a determination that the virtual reality user is proximal to the virtual object.

9. The computing system of claim 7, wherein the receiving the modification to the expanded note includes interpreting writing gestures by the virtual reality user.

10. The computing system of claim 7, wherein the receiving the selection of the original note includes receiving the selection of the original note based on detecting hand movement by the virtual reality user.

11. The computing system of claim 7, wherein the instructions are further configured to cause a device to provide haptic feedback to the virtual reality user in response to receiving the modification to the expanded note.

12. The computing system of claim 7, wherein expanding the original note to generate the expanded note includes presenting the expanded note with a size based on a previous size selection by the virtual reality user.

13. A method comprising:

determining that a first virtual reality user is in a first virtual location within a virtual reality environment;

causing a first virtual reality device associated with the first virtual reality user to present, based on the first virtual reality user being in the first virtual location, a first virtual reality scene including a set of notes;

in response to receiving a selection of an original note from the set of notes, causing the first virtual reality device to present the original note as moving toward the first virtual reality user and expanding to generate an expanded note, the expanded note being based on the original note;

receiving, from the first virtual reality device, a modification to the expanded note;

replacing, within the set of notes based on receiving the modification to the expanded note, the original note with a modified note;

determining that a second virtual reality user is in the first virtual location;

based on determining that the second virtual reality user is in the first virtual location, causing a second virtual reality device associated with the second virtual reality user to present a second virtual reality scene including the set of notes, the set of notes including the modified note;

determining that a third virtual reality user is in a second virtual reality location, the second virtual reality location being different from the first virtual location; and based on determining that the third virtual reality user is in the second virtual reality location, causing a third virtual reality device associated with the third virtual reality user to present a third virtual reality scene without presenting the set of notes.

14. The method of claim 13, wherein:

determining that the first virtual reality user is in the first virtual location includes determining that the first virtual reality user is within a first line of sight of a portion of a virtual object that presents the set of notes; and determining that the second virtual reality user is in the first virtual location includes determining that the second virtual reality user is within a second line of sight of the portion of the virtual object that presents the set of notes.

15. The method of claim 13, further comprising causing the first virtual reality device to present the modified note as moving away from the first virtual reality user.

16. The non-transitory computer-readable storage medium of claim 1, wherein the moving away from the virtual object by the original note simulates magnetic attraction between the original note and the virtual object.

17. The non-transitory computer-readable storage medium of claim 1, wherein the instructions are further configured to cause the virtual reality device to present the expanded note as moving toward the virtual object and returning to an original, smaller size.

18. The computing system of claim 7, wherein the moving away from the virtual object by the original note simulates magnetic attraction between the original note and the virtual object.

19. The computing system of claim 7, wherein the instructions are further configured to cause the computing system to present the expanded note as moving toward the virtual object and returning to an original, smaller size.

\* \* \* \* \*